United States Patent

(12) United States Patent
Ueda et al.

(10) Patent No.: US 8,941,845 B2
(45) Date of Patent: Jan. 27, 2015

(54) IMAGE FORMING APPARATUS

(71) Applicants: Tadayuki Ueda, Tokyo (JP); Yoshihito Sasamoto, Tokyo (JP); Toru Kasamatsu, Aichi (JP); Eiji Nishikawa, Tokyo (JP); Satoshi Miyajima, Tokyo (JP); Takanobu Shiki, Tokyo (JP)

(72) Inventors: Tadayuki Ueda, Tokyo (JP); Yoshihito Sasamoto, Tokyo (JP); Toru Kasamatsu, Aichi (JP); Eiji Nishikawa, Tokyo (JP); Satoshi Miyajima, Tokyo (JP); Takanobu Shiki, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 42 days.

(21) Appl. No.: 13/758,280

(22) Filed: Feb. 4, 2013

(65) Prior Publication Data

US 2013/0201500 A1 Aug. 8, 2013

(30) Foreign Application Priority Data

Feb. 6, 2012 (JP) ................................. 2012-023188

(51) Int. Cl.
*H04N 1/40* (2006.01)
*G06K 15/02* (2006.01)
*G03G 15/00* (2006.01)

(52) U.S. Cl.
CPC ................ *G06K 15/02* (2013.01); *G03G 15/00* (2013.01)
USPC .......................... 358/1.12; 358/1.18; 358/468

(58) Field of Classification Search
CPC ...................... G03G 15/0131; G03G 15/5058; G03G 2215/00059; G03G 2215/0161; G03G 15/5008; G03G 2215/0158; G03G 15/0178; H04N 1/58; H04N 13/0422; G06K 15/02

USPC ......... 358/1.9, 518, 1.12, 1.18, 2.1, 500, 504, 358/468; 399/301, 49, 72, 101, 302, 303

See application file for complete search history.

(56) References Cited

U.S. PATENT DOCUMENTS

| 8,526,867 B2 * | 9/2013 | Cho et al. ...................... 399/301 |
| 2004/0101278 A1 * | 5/2004 | Moriyama et al. .............. 386/46 |
| 2004/0156653 A1 | 8/2004 | Takehara |

FOREIGN PATENT DOCUMENTS

| EP | 1 434 107 A2 | 6/2004 |
| JP | 63-039275 | 2/1988 |
| JP | 2002-072592 | 3/2002 |
| JP | 2004-191439 A | 7/2004 |
| JP | 2007-164093 A | 6/2007 |

OTHER PUBLICATIONS

English-language translation of Rejection Notice for corresponding Japanese Patent Application No. 2012-023188, Jun. 3, 2014.

* cited by examiner

*Primary Examiner* — Thomas D Lee
*Assistant Examiner* — Stephen M Brinich
(74) *Attorney, Agent, or Firm* — Lucas & Mercanti, LLP

(57) ABSTRACT

An image forming apparatus which allows a user to freely select a desired image quality is provided. The control unit 60 sets a of registration set value A1 for determining a color registration error suppression level and a dropout set value A2 for determining a dropout occurrence suppression level. Also, the control unit 60 sets a differential circumferential speed which is the difference between the circumferential speed of photoreceptor drums 1Y to 1K and the circumferential speed of an intermediate transfer belt 6 on the basis of the color registration set value A1 and the dropout set value A2. Then, the control unit 60 controls the belt drive motor 61 and the drum drive motor 62 on the basis of the differential circumferential speed which is set.

6 Claims, 4 Drawing Sheets

IMAGE FORMING APPARATUS

CROSS-REFERENCE TO RELATED APPLICATIONS

The present application claims priority under 35 U.S.C. §119 to Japanese Patent. Application No. 2012-23188, filed Feb. 6, 2012. The contents of this application are herein incorporated by reference in their entirety.

FIELD OF INVENTION

The present invention relates to an image forming apparatus.

DESCRIPTION OF RELATED ART

Image forming apparatuses such as printers, copying machines and so forth are known as electrophotographic systems, which are expected to perform image formation with a high quality. The quality of an image is evaluated from different viewpoints in accordance with needs of users. For example, criterions for evaluating image quality include color registration errors, i.e., positional misalignment among color components, which is likely to draw attention when forming full color images such as photographs. Also, criterions for evaluating image quality include dropouts, i.e., omission of part of an image, which is likely to draw attention when printing images which consist mainly of characters and the like.

For example, Japanese Patent Published Application No. 2002-72592 discloses an image forming apparatus which suppresses occurrence of dropouts. Taking into consideration that the degree of dropout formation depends upon environmental humidity, according to this technique, dropout formation is suppressed by changing the differential circumferential speed between the circumferential speed of an image bearing member and the circumferential speed of an intermediate transfer belt corresponding to environmental humidity.

However, since the quality of an image is evaluated from different viewpoints in accordance with needs of users, it is desired to provide an image forming apparatus which allows a user to freely select a desired image quality factor, rather than focusing attention on a particular image quality factor such as dropouts.

The present invention has been made in order to solve the shortcomings as described above. It is an object of the present invention therefore to provide an image forming apparatus which meets the requirement for image quality a user desired.

SUMMARY OF THE INVENTION

To achieve at least one of the abovementioned objects, an image forming apparatus reflecting one aspect of the present invention comprises: a plurality of image bearing members configured to bear images of predetermined color components respectively; an intermediate transfer belt configured to form a superimposed image by successively transferring the images from the plurality of image bearing members on the intermediate transfer belt; a first drive unit configured to rotate the plurality of image bearing members; a second drive unit configured to rotate the intermediate transfer belt; a setting unit configured to set a first set value for designating a level at which is suppressed color registration errors which are positional misalignment among the images of color components transferred to the intermediate transfer belt, and a second set value for designating a level at which is suppressed occurrence of dropouts corresponding to part of the images of color components lingering on the plurality of image bearing members even after transfer to the intermediate transfer belt; and a speed control unit configured to set a differential circumferential speed which is the difference between the circumferential speed of the intermediate transfer belt and the circumferential speed of the plurality of image bearing members on the basis of the first set value and the second set value which are set by the setting unit, and control the first drive unit and the second drive unit on the basis of the differential circumferential speed which is set.

Preferably, the image forming apparatus of the present invention further comprises: an input unit which can be operated by a user to input information, wherein the setting unit sets the first set value and the second set value on the basis of the information input by the user through the input unit.

Also, in accordance with the present invention, it is preferred that the setting unit sets the first set value and the second set value on the basis of image data for forming an image.

Furthermore, in accordance with the present invention, it is preferred that the speed control it is provided with a plurality of weight coefficients which can be alternatively selected in accordance with a printing condition, and sets the differential circumferential, speed in which is reflected the weight coefficient corresponding to the printing condition.

Furthermore, preferably, the image forming apparatus of the present invention further comprises: an input unit which can be operated by a user to input information, wherein the speed control unit adjusts the weight coefficient on the basis of the information input by the user through the input unit.

Furthermore, in accordance with the present invention, it is preferred that the speed control unit controls the circumferential speed of the plurality of image bearing members corresponding to the differential circumferential speed, which is set, by controlling the first drive unit.

DETAILED DESCRIPTION OF THE PREFERRED EMBODIMENT

First Embodiment

Figure 1:
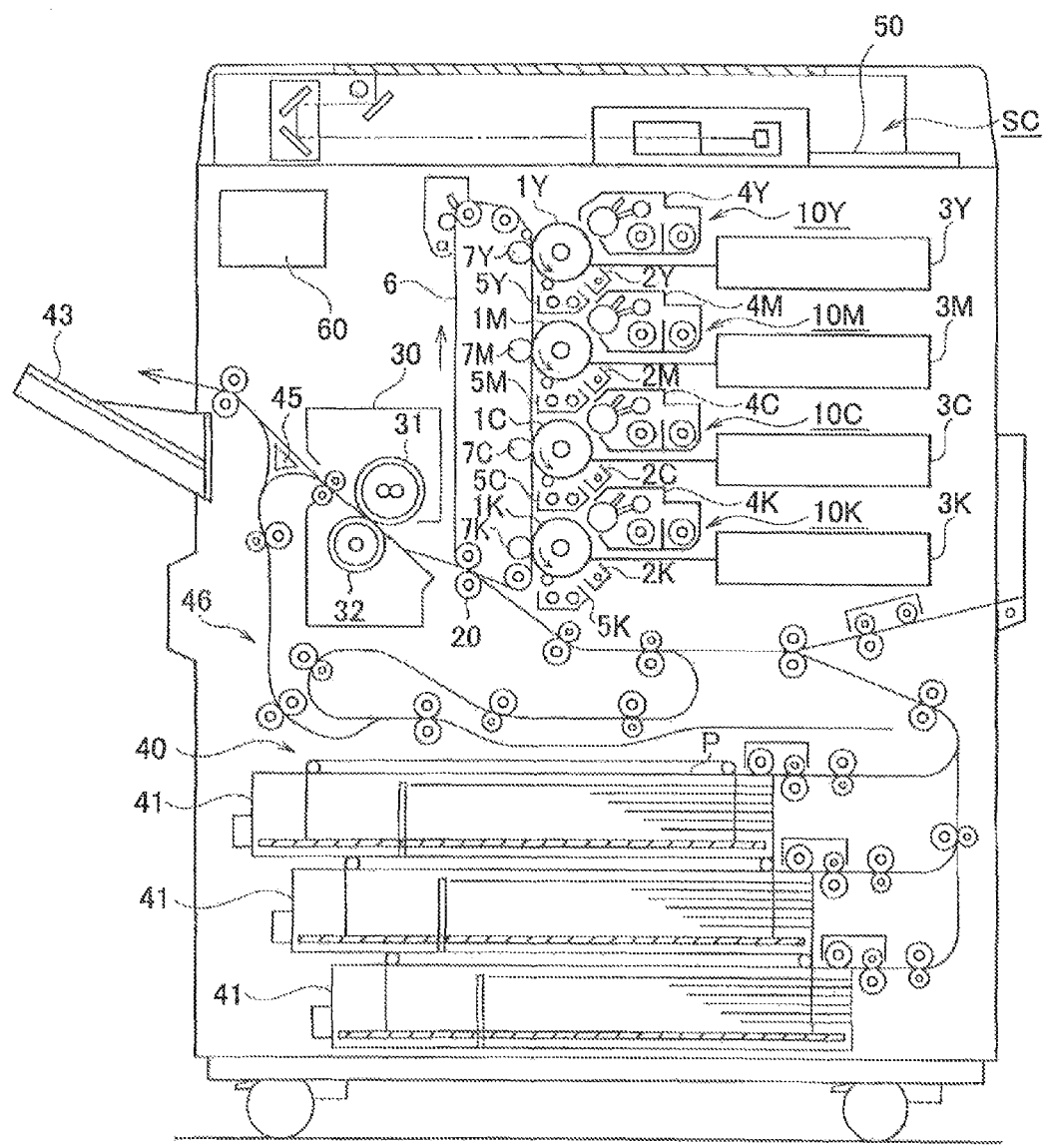
FIG. 1 is a view for schematically showing the configuration of an image forming apparatus according to the first embodiment of the present invention.

FIG. 1 is a view for schematically showing the configuration of an image forming apparatus according to the first embodiment. This image forming apparatus is a copying machine which is an electrophotographic image forming apparatus called a tandem color image forming apparatus. The tandem color image forming apparatus includes a plurality of photoreceptor drums vertically arranged in contact with one intermediate transfer belt to form full-color images.

The image forming apparatus consists mainly of an original reading unit SC, four image forming units 10Y, 10M, 10C and 10K, and a fixing unit 30 which are installed within one housing.

The original reading unit SC scans and exposes the image of an original with an optical system of a scanning exposing device, and reads the reflected light therefrom with a line image sensor to obtain image signals. The image signals are processed by performing A/D conversion, shading compensation, data compression and no on, and input, to a control unit 60 as image data. Incidentally, the image data input to the control unit 60 is not limited to the image data as read by the original reading unit SC, but can be the data for example as received from another image forming apparatus, a personal computer or the like connected to the image forming apparatus.

The image forming units 10Y, 10M, 10C and 10K are an image forming unit 10Y for forming yellow (Y) images, an image forming unit 10M for forming magenta (M) images, an image forming unit 100 for forming cyan (C) color images, and an image forming unit 10K for forming black (K) images.

The image forming unit 10Y is provided with a photoreceptor drum 11 which is an image bearing member, and a charging unit 2Y, an optical writing unit 3Y, a development unit 4Y and a drum cleaner 5Y which are arranged around the photoreceptor drum 1Y. Likewise, the other image forming units 10M, 10C and 10K are provided with photoreceptor drums 1M, 1C and 1K, and charging units 2M, 2C and 2K, optical writing units 3M, 3C and 3K, development units 4M, 4C and 4K, drum cleaners 5M, 5C and 5K which are arranged around the image forming units 10M, 10C and 10K respectively.

The surfaces of the photoreceptor drums 1Y, 1M, 1C and 1K are uniformly charged with electricity by the charging units 2Y, 2M, 2C and 2K, and the optical writing units 3Y, 3M, 3C and 3K performs a scanning exposure process to form latent images on the photoreceptor drums 1Y, 1M, 1C and 1K. The development units 4Y, 4M, 4C and 4K then make visible the latent images on the photoreceptor drums 1Y, 1M, 1C and 1K by developing the images with toners. Namely, toner images are formed on the photoreceptor drums 1Y, 1M, 1C and 1K respectively corresponding to yellow, magenta, cyan and black, so that the photoreceptor drums 1Y, 1M, 1C and 1K bear images of predetermined color components respectively.

The toner images formed on the photoreceptor drums 1Y, 1M, 1C and 1K are transferred to a predetermined location of an intermediate transfer belt 6 through first transfer rollers 7Y, 7M, 7C and 7K. The intermediate transfer belt 6 is rotatably wound around a plurality of rollers. The toner images are successively transferred from the plurality of photoreceptor drums 1Y, 1M, 1C and 1K onto the intermediate transfer belt 6, and superimposed to form a full-color toner image. The full-color toner image transferred to the intermediate transfer belt 6 is then transferred to the sheet P conveyed with a predetermined timing through a second transfer roller 20.

The sheet P with the transferred toner images is conveyed to the fixing unit 30. The fixing unit 30 is a device which fixes the unfixed toner image to the sheet P, and consists, for example, of a pair of fixing rollers 31 and 32 forming a fixing nip part therebetween and a heater for heating the fixing roller 31. This fixing unit 30 fixes the toner image on the sheet P passed through the fixing nip part under the pressure applied between the pair of fixing rollers 31 and 32 and the heat generated from the fixing roller 31.

The sheet P with the image fixed by the fixing unit 30 is discharged by a discharging unit to a catch tray 43 attached to the external side of the housing. Also, when an image is to be formed also on the back side of the sheet P, the sheet P with the image formed on the front side is conveyed to a sheet reversing conveyance unit 46 located below by a guide member 45. The sheet reversing conveyance unit 46 reverses the sheet P which is conveyed, and directs the sheet P to a refeed conveying route. The sheet P conveyed to this refeed conveying route is conveyed to a transfer site of the toner image by the plurality of conveyance rollers.

A manipulation display 50 is located on the top of image forming apparatus and serves as an input unit through which information can be it by user's operation. Conversely, this manipulation display 50 serves also as a display unit which is controlled by the control unit 60 to display a variety of messages to a user. The manipulation display 50 can be implemented, for example, with a touch panel through which users can perform input operations with reference to information displayed on a screen.

Users can enter printing conditions, for example, the type (for example, paper density) of the sheet P to be printed, the number of print copies, a color registration set value A1 to be described below, a dropout set value A2 to be described below, and the like through the manipulation display 50. Alternatively, these printing conditions can be entered to the control unit 60 not only through the manipulation display 50 but also from, another image forming apparatus, a personal computer or the like connected to the image forming apparatus.

Figure 2:
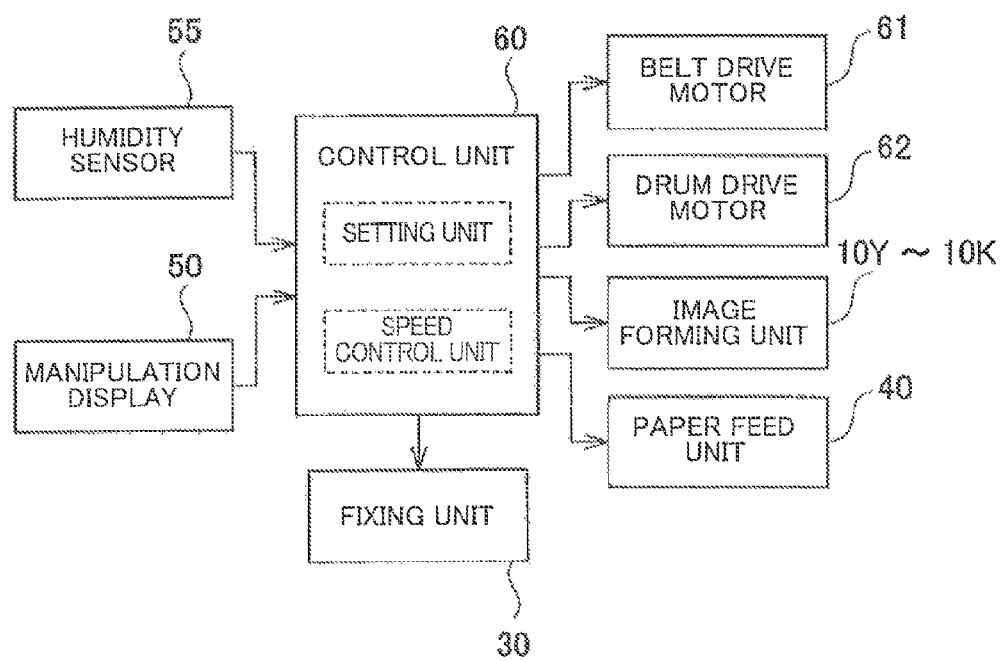
FIG. 2 is a block diagram for schematically showing the structure of the control architecture of the image forming apparatus.

FIG. 2 is a block diagram for schematically showing the structure of the control architecture of an image forming apparatus according to the present embodiment. The control unit 60 is responsible for integrally controlling the image forming apparatus and can be implemented with a microcomputer mainly including a CPU, memories such as a ROM and a RAM, and a communication I/F.

The control unit 60 forms a toner image on the sheet P by controlling these units of the image forming apparatus to perform the following operations, i.e., (1) charging the photoreceptor drums 1Y, 1M, 1C and 1K, (2) forming electrostatic latent images on the photoreceptor drums 1Y, 1M, 1C and 1K with the optical writing units 3Y, 3M, 3C and 3K, (3) making toners adhere to the electrostatic latent images as formed, (4) transferring the electrostatic latent images from the photoreceptor drums 1Y, 1M, 1C and IF to the intermediate transfer belt 6 as a first transfer process, (5) transferring the toner image from the intermediate transfer belt 6 to the sheet P as a second transfer process, and (6) fixing the toner image to the sheet P by the fixing unit 30.

In the case of the present embodiment, as seen from a functional view point, the control unit 60 is provided with a setting unit and a speed control unit.

The control unit 60 as the setting unit sets up a color registration set value A1 and a dropout set value A2.

The color registration set value A1 serves as a value (first set value) designating the level at which color registration errors are suppressed when forming images, "Color registration errors," as used herein, are can to describe positional misalignment among toner images or respective color components transferred on the intermediate transfer belt 6. Basically, during the image formation by the image forming apparatus, the occurrence of color registration errors tends to be minimized when the circumferential speed of the photoreceptor drums 1Y, 1M, 1C and 1K matches the circumferential speed of the intermediate transfer belt 6, and become greater when the absolute value of the difference (hereinafter referred to as "differential circumferential speed") between the circumferential speed of the photoreceptor drums 1Y, 1M, 1C and 1K and the circumferential speed of the intermediate transfer belt 6 increases. The color registration set value A1 can be defined with arbitrary units.

In the case of the present embodiment, the color registration set value A1 may take on one of seven integers from "−3" to "3", so that the smaller the color registration set value A1 is the higher the color registration error suppression level becomes, and conversely, the larger the color registration set value A1 is, the lower the color registration error suppression level becomes.

The dropout set value A2 serves as a value (second set value) designating the level, at which occurrence of dropouts is suppressed when forming images. "Dropouts," as used herein, are meant to describe the shortcomings that part of a toner image is not transferred from the photoreceptor drums 1Y, 1M, 1C and 1K to the intermediate transfer belt 6, but lingers on the photoreceptor drums 1Y, 1M, 1C and 1K. Usually, during the image formation by the image forming apparatus, the smaller the differential circumferential speed is, the more likely dropouts occur. Conversely, the larger the differential circumferential speed is, the less likely dropouts occur.

In other words, there is a tradeoff between the dropout occurrence suppression and the color registration error suppression as has been discussed above. The dropout set value A2 can be defined with arbitrary units. In the case of the present embodiment, the dropout set value A2 may take on one of seven integers from "−3" to "3", so that the larger the dropout set value A2 is, the higher the dropout occurrence suppression level becomes, and conversely, the smaller the dropout set value A2 is, the lower the dropout occurrence suppression level becomes.

Figure 3:
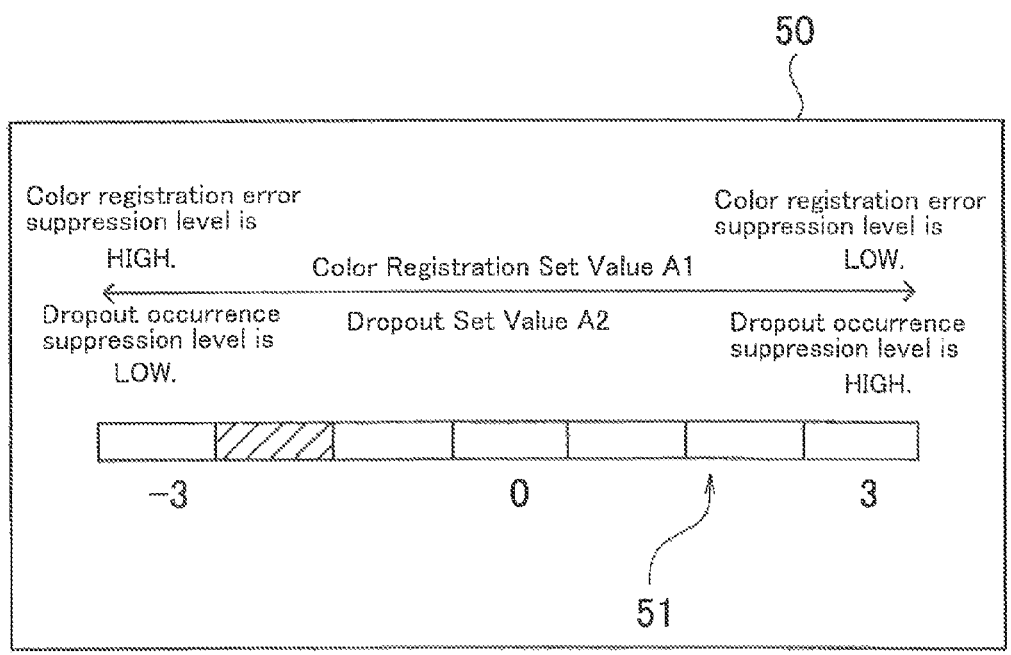
FIG. 3 is an explanatory view for showing an entry screen for inputting a color registration set value and a dropout set value.

In the case of the present embodimet, the control unit 60 sets the color registration set value A1 and the dropout set value A1 on the basis of the information input through the manipulation display 50 by a user. FIG. 3 is an explanatory view for showing an entry screen for inputting the color registration set value A1 and the dropout set value A2 through the manipulation display 50. Since there is a tradeoff between the dropout occurrence suppression and the color registration error suppression, a one-dimensional input bar 51 is used in the manipulation display 50 to select the set values A1 and A2 as a common value.

The manipulation display 50 is thereby constructed to enable selection of both the color registration set value A1 and the dropout set value A1 as a single value. Specifically speaking, the one-dimensional input bar 51 is divided into seven sections corresponding to "−3" to "3" respectively. A user can set up both the color registration set value A1 and the dropout set value as single value at once by arbitrarily selecting one of the seven sections.

The control unit 60 as the speed control unit sets the differential circumferential speed on the basis of the color registration set value A1 and the dropout set value A1 which are set. The control unit 60 then controls a belt drive motor and a drum drive motor 62 in order that the difference between the circumferential speed of the photoreceptor drums 1Y, 1M, 1C and 1K and the circumferential speed of the intermediate transfer belt 6 matches the differential circumferential speed which is set.

The belt drive motor 61 is a drive unit for rotationally driving the intermediate transfer belt 6, and mechanically connected to a drive, roller, around which the Intermediate transfer belt 6 is extended, through a power transmission mechanism not shown in the figure. On the other hand, the drum drive motor 62 is a drive unit for rotationally driving the photoreceptor drums 1Y, 1M, 1C and 1K of the respective color components, and mechanically connected to the photoreceptor drums 1Y, 1M, 1C and 1K respectively through power transmission mechanism not shown in the figure.

The control unit 60 receives a sensor signal input from a humidity sensor 55. The humidity sensor 55 is a sensor which detects an environmental humidity, and preferably located in the image forming apparatus in order to detect the inside humidity thereof which may affect the image forming process.

Figure 4:
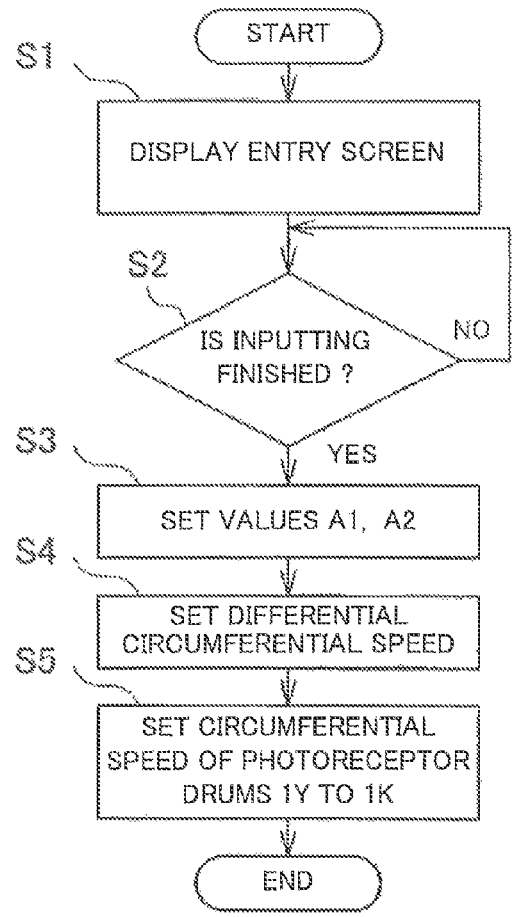
FIG. 4 is a flow chart for showing a method of setting the differential circumferential speed of the image forming apparatus.

FIG. 4 is a flow chart for showing a method of setting the differential circumferential speed of the image forming apparatus according to the present embodiment. The process shown in the flow chart is performed, for example, when a user sets the set values for performing a job.

First, in step 1 (S1), the control unit 60 controls the manipulation display 50 to display a predetermined entry screen (for example, the screen shown in FIG. 3), and prompts for the color registration set value A1 and the dropout set value A2 through the entry screen.

In step 2 (S2), the control unit 60 determines whether or not the color registration set value A1 and the dropout set value A2 have been input. If this determination is in the affirmative in step 2, i.e., if the input operation is finished, the process proceeds to step 3 (S3). Conversely, if this determination is in the negative in step 2, i.e., if the input operation is not finished, step 2 is performed again. Incidentally, since the color registration set value A1 and the dropout set value A2 have been initialized to "0", even if there is no input from a user, the process proceeds to step 3 with the values being set to "0" after repeating the negative determination in step 2 for a predetermined number of times.

In step 3, the control unit 60 sets the color registration set value A1 and the dropout set value A2 on the basis of the information input through the manipulation display 50 by a user. For example, receiving the information that a user has selected the second section of the input bar from the left as shown in FIG. 3 through the manipulation display 50, the control unit 60 sets the color registration set value A1 and the dropout set value A2 to "−2" respectively.

In step 4 (S4), the control unit 60 sets the differential circumferential speed on the basis of the color registration set value A1 and the dropout set value A2 which are set. For example, the control unit 60 has a table (refer to Table 1) or a calculation formula for obtaining the correspondence of the color registration set value A1 and the dropout set value A2 to the differential circumferential speed for use in setting the differential circumferential speed.

TABLE 1

| | A1, A2 | | | | | | |
|---|---|---|---|---|---|---|---|
| | −3 | −2 | −1 | 0 | 1 | 2 | 3 |
| Vd | 0% | 0.1% | 0.15% | 0.2% | 0.25% | 0.3% | 0.35% |

In the above table, Vd is differential circumferential speed.

For example, if the color registration set, value A1 and the dropout set value A2 are "−2", the control unit 60 sets the differential circumferential speed to 0.1% with reference to Table 1 to a value which is calculated by the calculation formula. In the case of the present embodiment, if the differential circumferential speed is 0.1%, the a circumferential speed of the photoreceptor drums 1Y, 1M, 1C and 1K is lower than the circumferential speed of the intermediate transfer belt 6 by 0.1%. The differential circumferential speed, however, is set as a numeric value which is defined on the basis of command values input to the drive motors respectively, and there may be an error in comparison with the actual value due to the radius tolerances of the drive rollers. Accordingly, it is conceived to give a predetermined range (±0.1%) to the motors command values corresponding to a zero differential circumferential speed.

In step 5 (S5), the control unit 60 sets the circumferential speed of the photoreceptor drums 1Y, 1M, 1C and 1K on the basis of the differential circumferential speed which is set. Specifically, the control unit 60 sets the circumferential speed of the photoreceptor drums 1Y, 1M, 1C and 1K to a value which is obtained from the differential circumferential speed in relation to the circumferential speed (predetermined speed determined according to the system linear speed) of the intermediate transfer belt 6.

When the differential circumferential speed is set up as described above, the control unit 60 controls the belt drive motor 61 and the drum drive motor 62 on the basis of the differential circumferential speed which is set to perform the image forming corresponding to a user's job. Specifically, the control unit 60 controls the belt drive motor 61 to adjust the circumferential speed of the intermediate transfer belt 6 to a predetermined value which is determined, in accordance with the system linear speed. Also, the control unit 60 controls the drum drive motor 62 to adjust the circumferential speed of the photoreceptor drums 1Y to 1K to the value which is set in step 5.

In the case of the present embodiment as described above, the control unit 60 sets the color registration set value A1 for determining the color registration error suppression level and the dropout set value 112 for determining the dropout occurrence suppression level. Also, the control unit 60 sets the differential circumferential speed which is the difference between the circumferential speed of the photoreceptor drums 1Y to 1K and the circumferential speed of the intermediate transfer belt 6 on the basis of the color registration set value A1 and the dropout set value A2. The control unit 60 then controls the belt drive motor 61 and the drum drive motor 62 on the basis of the differential circumferential speed which is set.

By this configuration, since different image quality factors such as color registration errors and dropouts can be arbitrarily selected, the performance of the image forming apparatus can be flexibly adjusted in accordance with the image quality that a user desires. It is possible to provide a convenient image forming apparatus.

Also, in the case of the present emobodimet, the control unit 60 sets the color registration set value A1 and the dropout set value A2 on the basis of the information input through the manipulation display 50 by a user. It is therefore possible to appropriately reflect the image quality that a user desired in the performance of the image forming apparatus.

Incidentally, in the case of the present embodiment, the control unit 60 sets the color registration set value A1 and the dropout set value A2 on the basis of the information input through the manipulation display 50 by a user. However, the control unit 60 may be designed to autonomously set the color registration set value A1 and the dropout set value A2 on the basis of image data itself rather than the information input by the user.

For example, if the control unit 60 determines that the content to be printed consists of illustrations on the basis of the image date, the color registration set value A1 and the dropout set value A2 are set to "1". Also, if the control unit 60 determines that the content to be printed consists of text on the basis of the image data, the color registration set value A1 and the dropout set value A2 are set to "2". Furthermore, if the control unit 60 determines that the content to be printed consists of graphics on the basis of the image data, the color registration set value A1 and the dropout set value A2 are set to "−2".

Since the control unit 60 autonomously sets the color registration set value A1 and the dropout set value A2 on the basis of the image data, it is possible to automatically set these values A1 and A2 to optimum values for the content to be printed. Because of this, even users who are not used to operate can automatically select a suitable image quality for image data in accordance with the content of the image data itself. Also, after autonomously setting the color registration set value A1 and the dropout set value A2, the control unit 60 may allow a user to set up the color registration set value A1 and the dropout set value A2.

Figure 5:
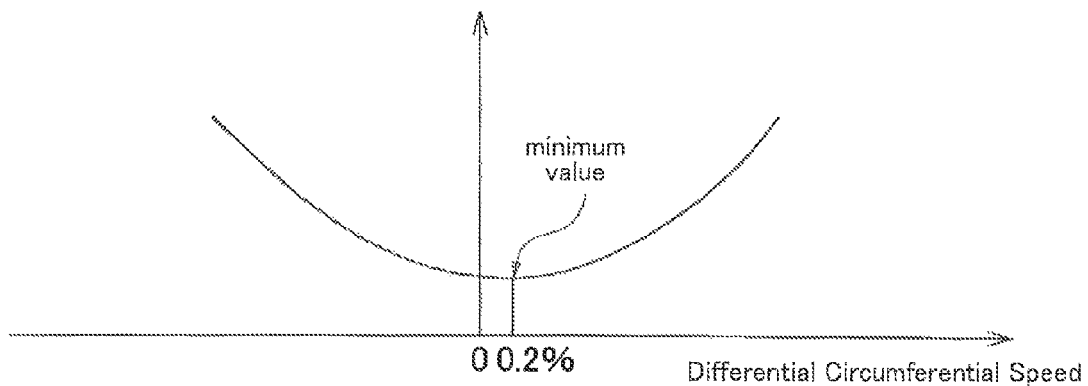
FIG. 5 is an explanatory view for showing the relationship between color registration errors and the differential circumferential speed.

Furthermore, in this embodiment, the relationship between the differential circumferential speed and the color registration set value A1 or the dropout set value A2 is prepared on the assumption that color registration errors are suppressed in an maximum way when the differential circumferential, speed is zero. However, the differential circumferential speed with which color registration errors are minimized may depend on the specifications and performance of the image forming apparatus. For example, the minimization, of color registration errors may be achieved when the differential circumferential speed is 0.2% as illustrated in FIG. 5. It is thereby preferred to take into consideration the specifications and performance of the image forming apparatus for determining the relationship between the differential circumferential speed and the color registration set value A1 or the dropout set value A2.

Figure 6:
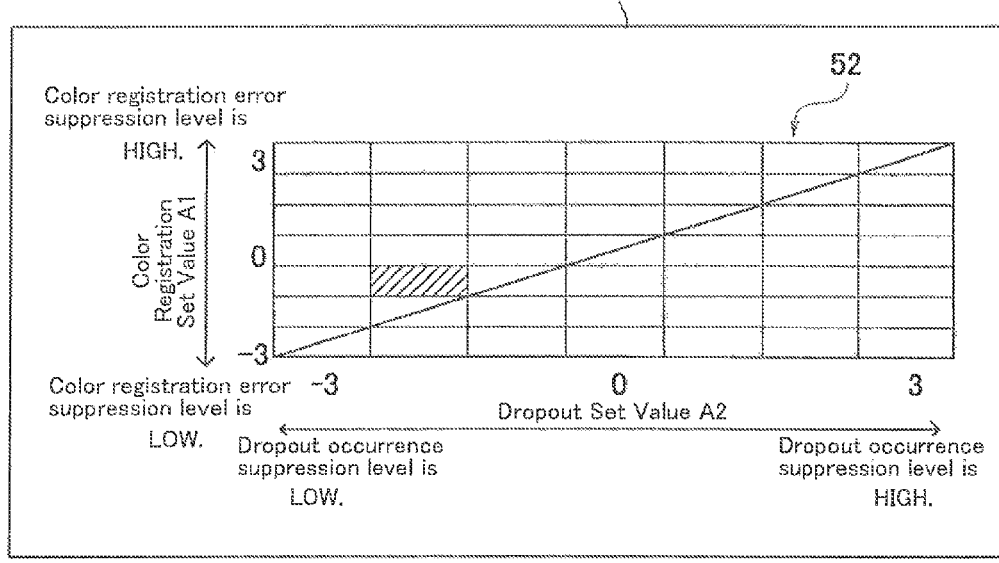
FIG. 6 is an explanatory view for showing an entry screen for inputting a color registration set value and a dropout set value.

Also, in the case of the present embodiment, since there is a tradeoff between the dropout occurrence suppression and the color registration error suppression, the manipulation display 50 makes it possible to input the color registration set value A1 and the dropout set value A2 through the one-dimensional input bar 51. However, as illustrated in FIG. 6, the manipulation display 50 can be designed to provide a two-dimensional input matrix 52 for independently setting the color registration set value A1 and the dropout set value A2. By this configuration, since different image quality factors such as color registration errors and dropouts can be flexibly selected, the image quality that a user desired can be reflected in the performance of the image forming apparatus.

In the case of the present embodiment, the control unit controls the circumferential speed of the photoreceptor drums 1Y, 1M, 1C and 1K in accordance with the differential circumferential speed which is set by controlling the drum drive motor 62. The differential circumferential speed is the difference between the circumferential speed of the intermediate transfer belt 6 and the circumferential speed of the photoreceptor drums 1Y, 1M, 1C and 1K. It is therefore possible to set the desired differential circumferential speed by adjusting either or both the circumferential speeds.

However, when the circumferential speed of the intermediate transfer belt 6 is changed, the conveying speed of the sheet P has to be synchronized therewith. The reduce/enlarge ratio otherwise would deviates from what is expected, so that the conveying speed of the sheet P must be adjusted to prevent the reduce/enlarge ratio from deviating. This shortcoming can be avoided by adjusting the circumferential speed of the photoreceptor drums 1Y to 1K to easily implement a desired differential circumferential speed, Second Embodiment In what follows, an image forming apparatus according to the second embodiment will be explained. Meanwhile, the second embodiment will, be explained, mainly with respect to the differences from the first embodiment without repeating redundant description.

Figure 7:
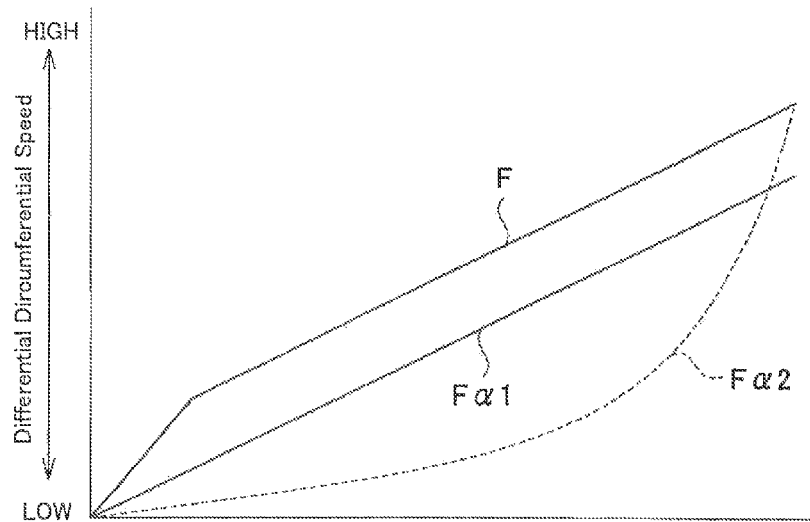
FIG. 7 is an explanatory view for showing the concept of setting the differential circumferential speed by the use of a weight coefficient.

FIG. 7 is an explanatory view for showing the concept of setting the differential circumferential speed by the use of a weight coefficient α. In the present embodiment, the control unit 60 provides a plurality of weight coefficients α (for example, weight coefficients α1 and α2) which can be alternatively selected in accordance with a printing condition. The control unit 60 then sets the differential circumferential speed in which the weight coefficient α is reflected in accordance with a printing condition as shown in the following equation.

$$Vd = F \cdot \alpha \qquad \text{Equation 1}$$

In the above Equation, Vd corresponds to differential circumferential speed, and α corresponds to weight coefficient. Also, F corresponds to the base value of the differential circumferential speed which is set with reference to the color registration set value A1 and the dropout set value A2, and determined on the basis of a command input by a user or analysis of image data as described in the first embodiment.

The printing conditions for selecting the weight coefficient α include the paper type of the sheet P, the environmental humidity and so forth.

The system linear speed of the image forming apparatus may be determined in accordance with the paper type of the sheet P. For example, when the paper type of the sheet P is heavy paper, the system linear speed is reduced to about a half as compared with that of standard paper. The circumferential speed of the intermediate transfer belt 6 is determined in accordance with the system linear speed. However, the differential circumferential speed has to be different between printing tasks to be performed with the intermediate transfer belt 6 rotating at high and low circumferential speeds respectively, in order to obtain an equivalent image quality when the same color registration set value A1 and the same dropout set value A2 are set.

The control unit 60 therefore selects a weight coefficient α in accordance with the paper type of the sheet P as a printing condition, and sets the differential circumferential speed in which is reflected the weight coefficient α which is set. As illustrated in FIG. 6, the relationship between the differential circumferential speed and the color registration set value A1 and the dropout set value A2 can be adjusted selecting "α1" as a weight coefficient.

Meanwhile, it is not required to calculate on a real time base the differential circumferential speed in which the weight coefficient α is reflected. For example, in accordance with several paper types of the sheet P, a plurality of tables can be provided in advance by taking the weight coefficient α into consideration. The control unit 60 selects an appropriate table (refer to Table 2) defining the correspondence of the differential circumferential speed to the color registration set value A1 and the dropout set value A2 on the basis of the paper type of the sheet P, and sets the differential circumferential speed by the use of this table.

TABLE 2

| | A1, A2 | | | | | | |
|---|---|---|---|---|---|---|---|
| | −3 | −2 | −1 | 0 | 1 | 2 | 3 |
| Vd | 0% | 0.05% | 0.1% | 0.15% | 0.2% | 0.25% | 0.3% |

In the above table, Vd is differential circumferential, speed.

An appropriate image quality can be obtained irrespective of differences in the paper types of the sheet P in accordance with the color registration set value A1 and the dropout set value A2 which are set, on the basis of a command input by a user or analysis of image data.

On the other hand, when the humidity is high, there is a tendency that occurrence of dropouts are more likely than when the humidity is low. Because of this, in order to obtain an appropriate image quality for the color registration set value A1 and the dropout set value A2 as desired, it may sometimes be preferable to set different differential circumferential speeds for a higher and a lower environmental humidity.

The control unit 60 therefore may select a weight coefficient α in accordance with the environmental humidity as a printing condition, in the same manner as selecting with the paper type of the sheet P as a printing condition, and sets the differential circumferential speed in which is reflected the weight coefficient which is selected. Thereby, an appropriate image quality can be obtained irrespective of a differential environmental humidity in accordance with the color registration set value A1 and the dropout set value A2 which are set on the basis of a command input by a user or analysis of image data.

In the case of the present embodiment as has been discussed above, there are a plurality of weight coefficients α from which a weight coefficient can be selected in accordance with a printing condition by the control unit 60 which then sets the differential circumferential speed in which the selected weight coefficient, is reflected. By this configuration, since the differential circumferential speed is changed in accordance with a printing condition, the performance of the image forming apparatus can be flexibly adjusted. It is thereby possible to easily realize the same image quality irrespective of differences in printing conditions.

Meanwhile, the weight coefficient α is not limited to a constant value but can be defined as a function α2 reflecting a printing condition as shown in FIG. 7. It is therefore possible to flexibly respond to differences in printing conditions.

Alternatively, the manipulation display 50 may be configured to allow a user to arbitrarily set the characteristics of the weight coefficient α, i.e., the curve shown in FIG. 7 (the correspondence of the differential circumferential speed to the color registration set value A1 and the dropout set value A2). It is therefore possible to implement the printing environment, that meets the user's intention.

The foregoing description has been presented on the basis of the image forming apparatus according to the present invention. However, it is not intended to limit the present invention to the precise form described, and obviously many modifications and variations are possible within the scope of the invention.

The invention claimed is:
1. An image forming apparatus comprising:
a plurality of image bearing members configured to bear images of predetermined color components respectively;

an intermediate transfer belt configured to form a superimposed image by successively transferring the images from said plurality of image bearing members on said intermediate transfer belt;

a first drive unit configured to rotate said plurality of image bearing members;

a second drive unit configured to rotate said intermediate transfer belt;

a setting unit configured to set a first set value for designating a level at which is suppressed color registration errors which are positional misalignment among the images of color components transferred to said intermediate transfer belt, and a second set value for designating a level at which is suppressed occurrence of dropouts corresponding to part of the images of color components lingering on the plurality of image bearing members even after transfer to said intermediate transfer belt; and a speed control unit configured to set a differential circumferential speed which is the difference between the circumferential speed of said intermediate transfer belt and the circumferential speed of said plurality of image hearing members on the basis of said first set value and said second set value which are set by said setting unit, and control said first drive unit and said second drive unit on the basis of the differential circumferential speed which is set.

2. The image forming apparatus of claim 1 further comprising:

an input unit which is operated by a user to input information, wherein said setting unit sets said first set value and said second set value on the basis of the information input by the user through said input unit.

3. The image forming apparatus of claim 1 wherein said setting unit sets said first set value and said second set value on the basis of image data for forming an image.

4. The image forming apparatus of claim 1 wherein said speed control unit is provided with a plurality of weight coefficients which are alternatively selected in accordance with a printing condition, and sets said differential circumferential speed in which is reflected the weight coefficient corresponding to the printing condition.

5. The image forming apparatus of claim 4 further comprising:

an input unit which is operated by a user to input information, wherein said speed control unit adjusts said weight coefficient on the basis of the information input by the user through said input unit.

6. The image forming apparatus of claim 1 wherein said speed control unit controls the circumferential speed of said plurality or image bearing members corresponding to said differential circumferential speed, which is set, by controlling said first drive unit.

* * * * *